(12) United States Patent
Kulkarni et al.

(10) Patent No.: US 8,894,154 B2
(45) Date of Patent: Nov. 25, 2014

(54) SEAT BACK INCLUDING INTEGRATED BACKREST AND REINFORCING COMPOSITE LAYER

(75) Inventors: Amit Kulkarni, Troy, MI (US); Kipp O. Grumm, Grand Rapids, MI (US); Peter A. Zorney, Plymouth, MI (US); Bernard Denis, Itteville (FR); Philippe Duhamel, Longjumeau (FR); Gregory Brncick, Holland, MI (US)

(73) Assignee: Faurecia Automotive Seating, Inc., Troy, MI (US)

( * ) Notice: Subject to any disclaimer, the term of this patent is extended or adjusted under 35 U.S.C. 154(b) by 426 days.

(21) Appl. No.: 13/254,695

(22) PCT Filed: Mar. 2, 2010

(86) PCT No.: PCT/US2010/025858
§ 371 (c)(1),
(2), (4) Date: Sep. 2, 2011

(87) PCT Pub. No.: WO2010/101874
PCT Pub. Date: Sep. 10, 2010

(65) Prior Publication Data
US 2011/0316320 A1 Dec. 29, 2011

Related U.S. Application Data

(60) Provisional application No. 61/208,915, filed on Mar. 2, 2009.

(51) Int. Cl.
*A47C 7/02* (2006.01)
*B60N 2/68* (2006.01)

(52) U.S. Cl.
CPC ............. *B60N 2/686* (2013.01); *B60N 2/682* (2013.01)
USPC .............. 297/452.1; 297/452.11; 297/452.14; 297/452.18; 297/452.29; 297/452.33

(58) Field of Classification Search
USPC .............. 297/452.1, 452.11, 452.14, 452.18, 297/452.29, 452.33, 452.34, 452.38, 297/452.65, 452.55, DIG. 2, 271.1, 279; 264/250, 271.1, 279; 428/411.1, 474.9
See application file for complete search history.

(56) References Cited

U.S. PATENT DOCUMENTS

| | | |
|---|---|---|
| 3,848,925 A | 11/1974 | Harder, Jr. |
| 4,832,408 A | 5/1989 | Bertsch et al. |

(Continued)

FOREIGN PATENT DOCUMENTS

| | | |
|---|---|---|
| DE | 4208150 A1 | 9/1993 |
| DE | 19757060 A1 | 6/1999 |

(Continued)

OTHER PUBLICATIONS

International Search Report for Application No. PCT/US2010/025858 dated May 3, 2010, 2 pages.

(Continued)

*Primary Examiner* — Laurie Cranmer
(74) *Attorney, Agent, or Firm* — Howard & Howard Attorneys PLLC (57) ABSTRACT

A seat back includes a backrest formed of a first polymeric material for supporting an occupant. A bracket formed of a different material than the first polymeric material of the backrest is anchored to the backrest for coupling to a seat cushion. A reinforcing composite layer is connected to the backrest and is formed of a second polymeric material and a plurality of fibers impregnated in the second polymeric material. The first polymeric material of the backrest is mechanically engaged with the bracket free of melt bonding between the first polymeric material of the backrest and the bracket. The first polymeric material of the backrest is melt bonded to the second polymeric material of the reinforcing composite layer integrating the backrest, the bracket, and the reinforcing composite layer.

20 Claims, 7 Drawing Sheets

(56) References Cited

U.S. PATENT DOCUMENTS

| | | | |
|---|---|---|---|
| 4,959,189 A * | 9/1990 | Rohrbacher et al. | 264/510 |
| 5,029,942 A | 7/1991 | Rink | |
| 5,085,928 A | 2/1992 | Krueger | |
| 5,100,204 A * | 3/1992 | Makihara et al. | 297/452.65 |
| 5,190,803 A | 3/1993 | Goldbach et al. | |
| 5,308,570 A * | 5/1994 | Hara et al. | 264/255 |
| 5,375,914 A * | 12/1994 | Donnelly | 297/335 |
| 5,506,029 A | 4/1996 | Hara et al. | |
| 5,531,950 A | 7/1996 | Kimura et al. | |
| 5,744,210 A | 4/1998 | Hofmann et al. | |
| 5,895,096 A * | 4/1999 | Massara | 297/452.34 |
| 5,940,991 A | 8/1999 | Cabalquinto | |
| 5,988,757 A * | 11/1999 | Vishey et al. | 297/452.31 |
| 6,056,366 A * | 5/2000 | Haynes et al. | 297/452.18 |
| 6,059,369 A | 5/2000 | Bateson et al. | |
| 6,074,004 A | 6/2000 | Carmichael | |
| 6,412,855 B1 | 7/2002 | Cantineau et al. | |
| 6,421,979 B1 * | 7/2002 | Fischer et al. | 52/745.19 |
| 6,423,388 B1 * | 7/2002 | Bateson et al. | 428/36.3 |
| 6,558,604 B1 | 5/2003 | Beckmann | |
| 6,644,722 B2 * | 11/2003 | Cooper | 296/187.02 |
| 6,739,673 B2 * | 5/2004 | Gupta et al. | 297/452.65 |
| 6,748,876 B2 | 6/2004 | Preisler et al. | |
| 6,767,067 B2 * | 7/2004 | Fourrey et al. | 297/452.18 |
| 6,908,132 B2 | 6/2005 | Bauhof | |
| 6,994,379 B2 | 2/2006 | Zoellner | |
| 7,125,466 B2 | 10/2006 | Cooper et al. | |
| 7,377,586 B2 | 5/2008 | Evans | |
| 7,677,644 B2 | 3/2010 | Wen et al. | |
| 7,731,294 B2 | 6/2010 | Yasuda et al. | |
| 7,837,271 B2 | 11/2010 | Galbreath et al. | |
| 2002/0094427 A1 | 7/2002 | Edwards et al. | |
| 2007/0238378 A1 | 10/2007 | Conover et al. | |
| 2008/0038569 A1 * | 2/2008 | Evans et al. | 428/474.9 |
| 2009/0058166 A1 | 3/2009 | Boes | |
| 2010/0291821 A1 | 11/2010 | Kirchner et al. | |

FOREIGN PATENT DOCUMENTS

| | | |
|---|---|---|
| DE | 19827563 A1 | 12/1999 |
| JP | S56-38664 U | 4/1981 |
| JP | S61-190251 U | 11/1986 |
| JP | 2003169725 | 6/2003 |
| JP | 2003-182417 A | 7/2003 |
| JP | 2004016710 | 1/2004 |
| WO | WO 03016091 A1 | 2/2003 |
| WO | WO 2010055482 A1 | 5/2010 |

OTHER PUBLICATIONS

English language abstract and translation for JP 2004-016710 extracted from the PAJ database on Apr. 11, 2011, 19 pages.

English language abstract and translation for JP 2003-169725 extracted from the PAJ database on Apr. 11, 2011, 48 pages.

English language abstract for DE 19757060 extracted from the espacenet.com database.

English language abstract for DE 19827563 extracted from the espacenet.com database.

English language abstract for DE 4208150 extracted from the espacenet.com database.

English language abstract for JP 2003-182417 extracted from the espacenet.com database on Aug. 13, 2013, 15 pages.

* cited by examiner

SEAT BACK INCLUDING INTEGRATED BACKREST AND REINFORCING COMPOSITE LAYER

The subject patent application claims priority to and all the benefits of International Patent Application No. PCT/US2010/025858, filed on Mar. 2, 2010 and U.S. Provisional Patent Application No. 61/208,915 which was filed on Mar. 2, 2009.

BACKGROUND OF THE INVENTION

1. Field of the Invention

The present invention generally relates to a seat back of a seat assembly for use in a vehicle.

2. Description of the Related Art

Seat assemblies for vehicles comprise a seat cushion extending generally horizontally and a seat back extending generally vertically from the seat cushion for supporting an occupant. A metal bracket is bolted, welded, or otherwise attached to the seat back and to the seat cushion to connect the seat back to the seat cushion. The seat back typically includes a metal frame and padding that covers the metal frame. The metal bracket and the metal frame must be sufficiently thick, strong, stiff, and properly designed to be properly attached to the vehicle and to adequately support forces exerted on the seat back by the occupant and to pass required crash tests. In addition, the padding that covers the metal frame is typically thick and cumbersome in order to provide adequate cushioning for the occupant seated in the seat assembly and for other occupants of the vehicle.

In the current vehicle market, especially the automotive market, increased weight is disadvantageous because, for among other reasons, it decreases fuel economy of the vehicle. Due to the heavy weight of various metal materials suitable for use in vehicles, the weight of the metal frame is relatively heavy and is therefore disadvantageous. In addition, the bracket that connects the seat back to the seat cushion is relatively heavy due to its construction from metal. However, metal is generally the material of choice in the design of seat back frames and brackets in current seat assemblies due to the strength of the metal so that the seat assembly can adequately support the occupant.

Another important factor in the current vehicle market is the aesthetic appearance and feel of the vehicle. This is especially true for interior components of the vehicle since interior components are constantly in view, and often in contact with, the occupants of the vehicle. A pleasing aesthetic appearance is not only pleasant to the occupant, but also conveys an impression of high quality and luxury. However, the metal frame and the metal bracket that connects the seat back to the seat cushion are thick and cumbersome. This thick construction of the frame and the bracket is typically used to provide adequate strength, but reduces the aesthetic appearance of the seat back and is inconsistent with current trends toward a streamlined look that occupants seek in vehicle interiors. Further, the thick and cumbersome appearance of the padding of many current seat backs conveys an impression not only of low quality but also of outdated technology. However, such thick and cumbersome padding is widely used on vehicle seats due to familiarity with the padding as well as the low cost ability to adequately hide the metal frame from sight of the occupants.

It would be advantageous to develop a seat assembly that is light weight and has a streamlined and aesthetically pleasing appearance while also having sufficient strength to adequately support an occupant.

SUMMARY OF THE INVENTION AND ADVANTAGES

A seat back comprises a backrest formed of a first polymeric material for supporting an occupant. A bracket is anchored to the backrest for coupling to a seat cushion and formed of a second material different than the first polymeric material of the backrest. A reinforcing composite layer is connected to the backrest and is formed of a second polymeric material and a plurality of fibers impregnated in the second polymeric material. The bracket is overmolded by the first polymeric material and the first polymeric material and is melt bonded to the second polymeric material of the reinforcing composite layer integrating the backrest, the bracket, and the reinforcing composite layer.

Also, a method of forming a seat back including a backrest formed of a first polymeric material, a reinforcing composite layer formed of a second polymeric material and a plurality of fibers impregnated in the second polymeric material, and a bracket includes placing the reinforcing composite layer into a mold. The method also includes placing the bracket into the mold adjacent to the reinforcing composite layer and heating the first polymeric material to a molten state. The method also includes introducing the first polymeric material in the molten state into the mold between and into contact with the reinforcing composite layer and the bracket to melt bond with the second polymeric material of the reinforcing composite layer and to mechanically engage the bracket.

The integration of the first polymeric material of the backrest, the reinforcing composite layer, and the bracket results in a seat back having a thin and streamlined appearance that is aesthetically pleasing to the occupant. In addition, the first polymeric material of the backrest, the reinforcing composite layer, and the bracket reinforce each other to provide adequate strength to support the occupant. In addition, the first polymeric material and the reinforcing composite layer are relatively lightweight thereby advantageously decreasing the weight of the seat assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
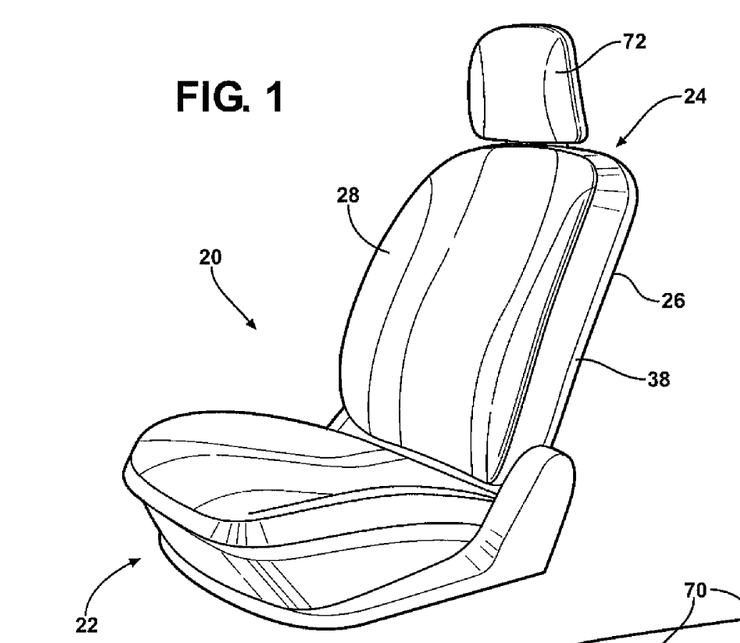
FIG. 1 is a perspective view of a seat assembly including a seat cushion and a seat back including a backrest and a cushion mounted to the backrest.

Referring to the Figures, wherein like numerals indicate like parts throughout the several views, a seat assembly is generally shown at 20. With reference to FIG. 1, the seat assembly 20 includes a seat cushion 22 extending generally horizontally and a seat back 24 extending generally vertically from the seat cushion 22 for supporting an occupant (not shown). The seat assembly 20 is disposed in a vehicle (not shown) such as, for example, an automobile, an airplane, a train, a boat, etc.

Figure 2:
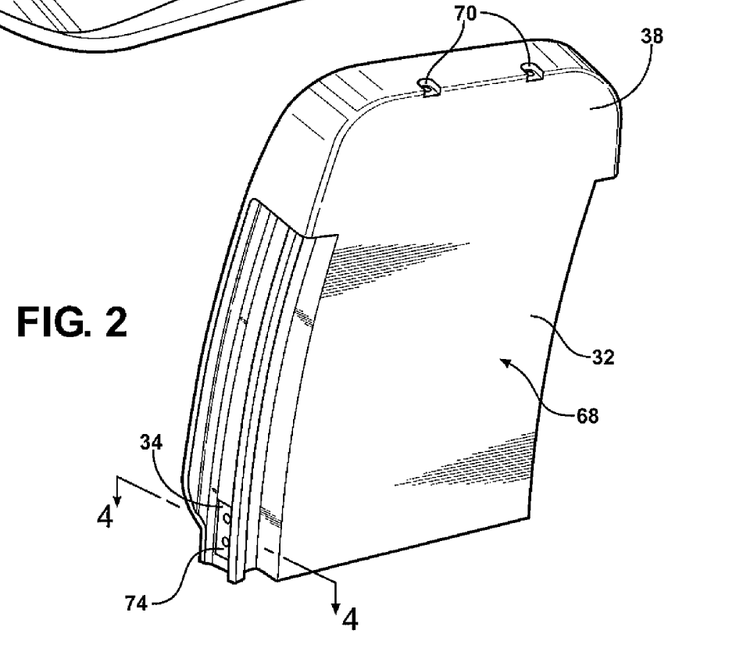
FIG. 2 is a perspective view of a rear side of the seat back without the cushion.
Figure 3:
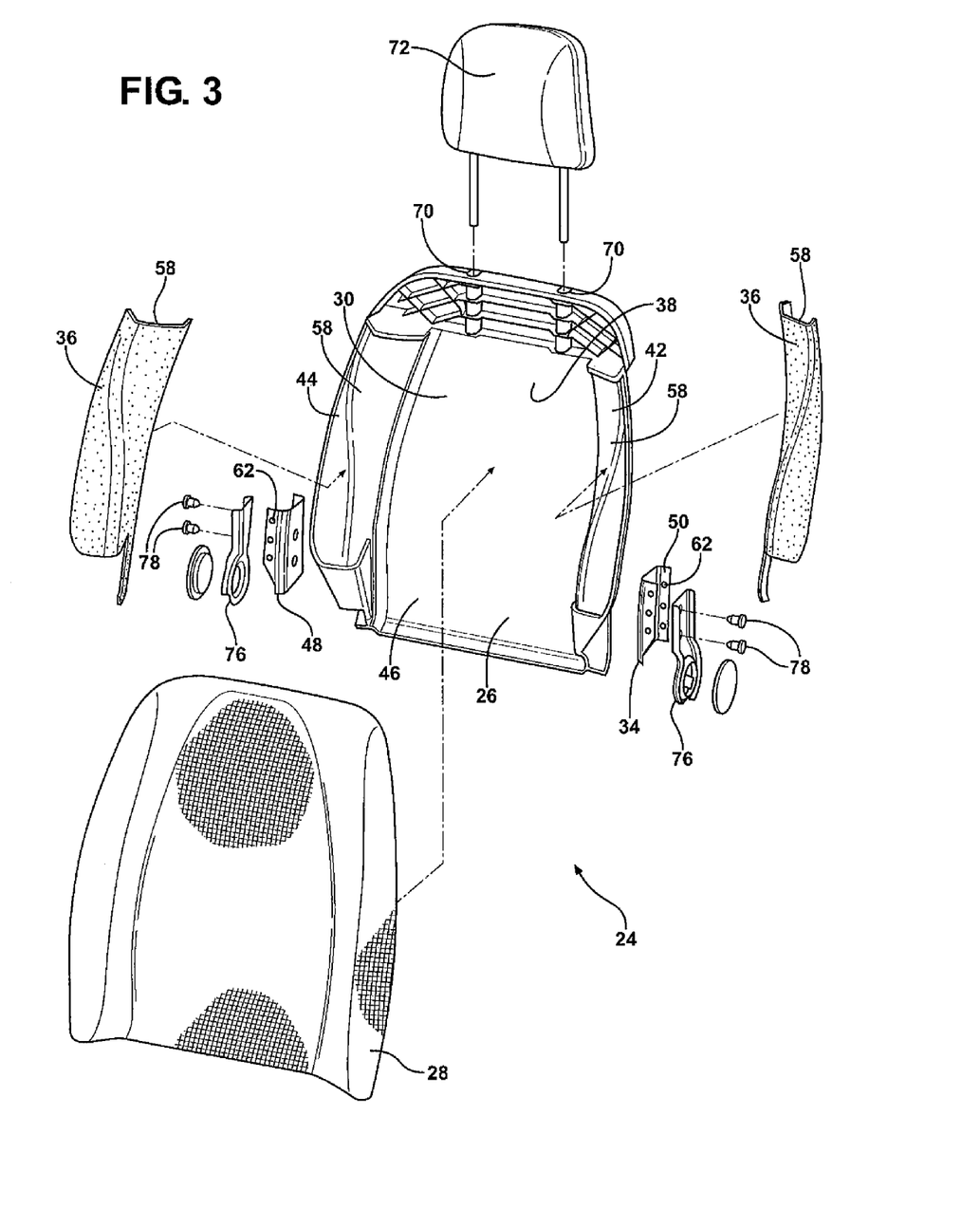
FIG. 3 is an exploded view of the seat back including a backrest, a reinforcing composite layer, and a bracket.

As shown in FIG. 2, the seat back 24 includes a backrest 26. Padding 28 can be mounted to a front side 30 of the backrest 26 and a rear side 32 of the back rest is typically uncovered, as described further below. With reference to FIG. 3, the backrest 26 is connected to a bracket 34 attached to the seat bottom 22 and a reinforcing composite layer 36 is connected to the backrest 26 to reinforce the backrest 26.

Figure 4:
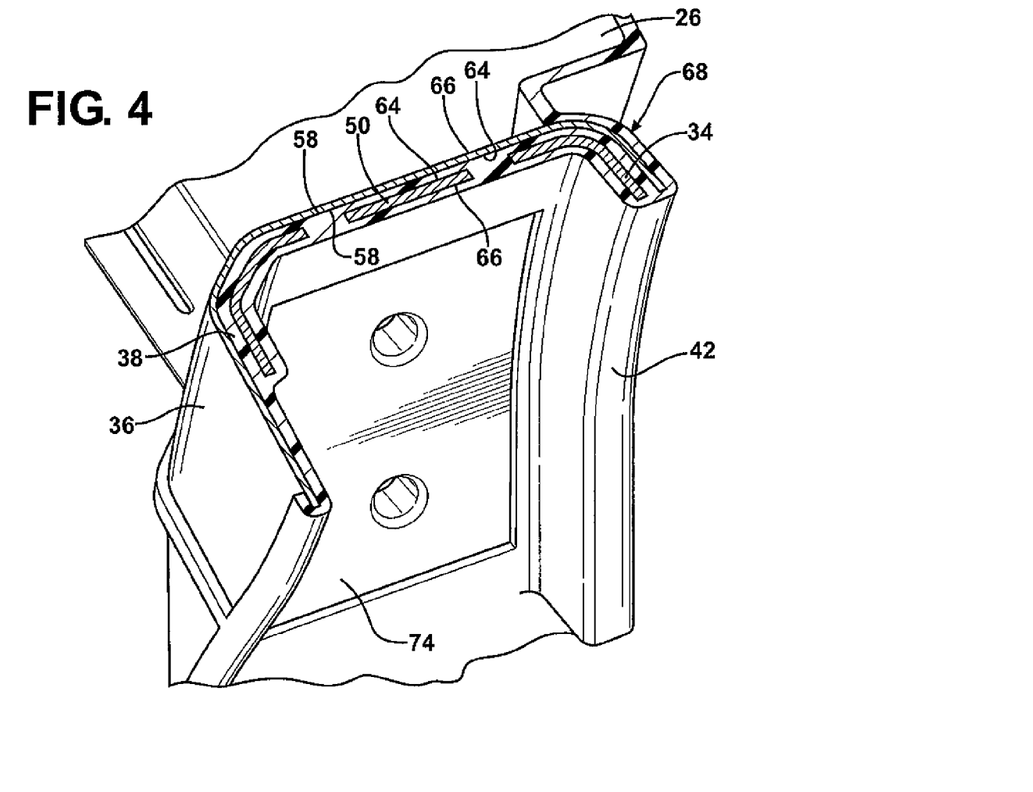
FIG. 4 is a cross-sectional view of the seat back of FIG. 2 along line 4-4.

With reference to FIG. 4, and as set forth further below, the backrest 26, the reinforcing composite layer 36, and the bracket 34 are integrated with one another to form a single integral component. In other words, the reinforcing composite layer 36 and the bracket 34 are mounted to the backrest 26 to form a single part, i.e., joined in a firm and substantially permanent manner. It should be appreciated that the reinforcing composite layer 36 and the bracket 34 are shown in an exploded view in FIG. 3 merely for descriptive and exemplary purposes and, in fact, the backrest 26, the reinforcing composite layer 36, and the bracket 34 are inseparable after the seat back 24 is formed.

With reference again to FIG. 3, the backrest 26 is formed of a polymeric material, hereinafter referred to as the first polymeric material 38 for identification purposes. Typically, the first polymeric material 38 is a thermoplastic material and, in any event, can be heated to a pliable or molten state to be shaped. For example, the first polymeric material 38 is capable of being injection molded such that the first polymeric material 38 can be molded into variety of configurations and shapes. Whether injection molded or otherwise, as set forth further below, the first polymeric material 38 of the backrest 26 is over molded onto the bracket 34 and the reinforcing composite layer 36 to integrate the first polymeric material 38 with the bracket 34 and the reinforcing composite layer 36.

In the embodiment where the first polymeric material 38 is injection molded, the first polymeric material 38 is typically of the type that produces a net-shaped product resulting from injection molding, i.e., is finished when removed from a mold 40. In other words, the first polymeric material 38 of the backrest 26 requires no secondary finishing operations after removal from the mold 40.

The first polymeric material 38 can be, for example, nylon, which will be hereinafter referred to as a first nylon for identification purposes. As one example, the first nylon is fiber reinforced nylon and an example of such fiber reinforced nylon is a glass fiber reinforced nylon that is commercially available from BASF Corporation in Florham Park, N.J. under the tradename Ultramid® TG7S PA6. It should be appreciated that the backrest 26 may be formed from any type of suitable polymeric material, reinforced or not, without departing from the nature of the present invention such as, for example, acrylonitrile butadiene styrene (ABS).

With reference to FIG. 3, the first polymeric material 38 of the backrest 26 defines a first pillar 42, a second pillar 44 spaced from the first pillar 42, and a middle section 46 extending from the first pillar 42 to the second pillar 44. The first 42 and second 44 pillars extend upwardly in a vertical direction from the seat cushion 22. The middle section 46 is recessed relative to the first 42 and second 44 pillars to support the torso of the occupant between the first 42 and second 44 pillars.

The bracket 34 is anchored to the backrest 26, as shown in FIG. 4, and is coupled to the seat cushion 22 to connect the backrest 26 to the seat cushion 22. With reference to FIG. 3, the bracket 34 is disposed along the first pillar 42 of the backrest 26. In addition, a second bracket 48 can be anchored to the backrest 26 at the second pillar 44. The second bracket 48 is a mirror image of the bracket 34 and is anchored to the backrest 26 in an identical manner as the bracket 34. For simplicity, only the bracket 34 is described in detail and it should be appreciated that the description of the bracket 34 is applicable to the second bracket 48. Alternatively, the second bracket 48 can be different than the bracket 34 and/or can be coupled to the backrest 26 in a different manner than the bracket 34.

Figure 5:
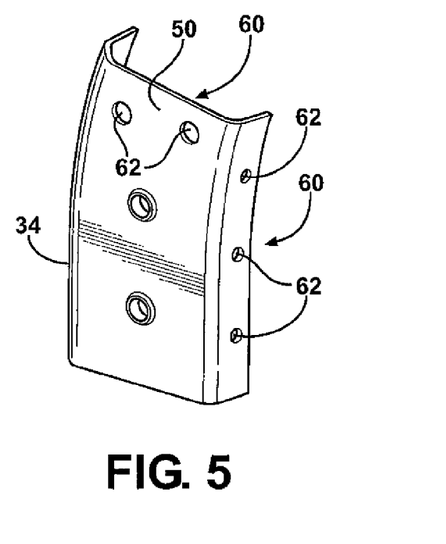
FIG. 5 is a perspective view the bracket prior to integration with the backrest.

With reference to FIG. 5, the bracket 34 is formed of a second material 50 different than the first polymeric material 38 of the backrest 26. Typically, the second material 50 of the bracket 34 is further defined as metal such as, for example, steel. However, it should be appreciated that the bracket 34 can be formed of any type of rigid material without departing from the nature of the present invention. The bracket 34 includes features for attaching other components to the bracket 34 and for attaching the bracket 34 to the seat cushion 22.

The reinforcing composite layer 36 reinforces the first pillar 42, the second pillar 44, and/or the middle section 46. In the embodiment shown in FIG. first pillar 42 to reinforce the first pillar 42. Also, the embodiment shown in FIG. 3 includes a second reinforcing composite layer 36 spaced from the reinforcing composite layer 36 with the second reinforcing composite layer 36 elongated in a vertical direction along the second pillar 44 to reinforce the second pillar 44. Another reinforcing composite layer 36 (not shown) can be integrated with the middle section 46.

Figure 7A:
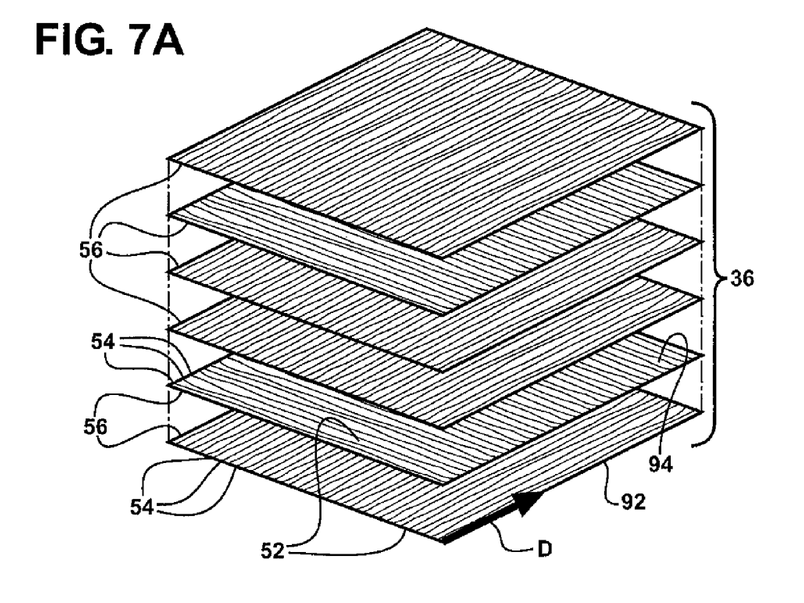
FIG. 7A is an exploded view of one embodiment of the reinforcing composite layer.
Figure 7B:
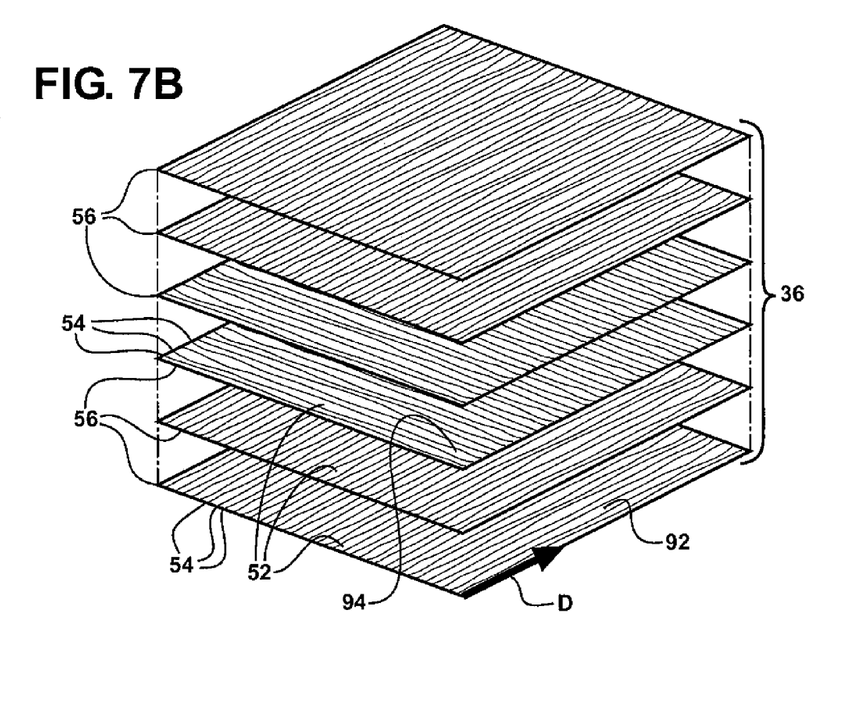
FIG. 7B is an exploded view of another embodiment of the reinforcing composite layer.
Figure 7C:
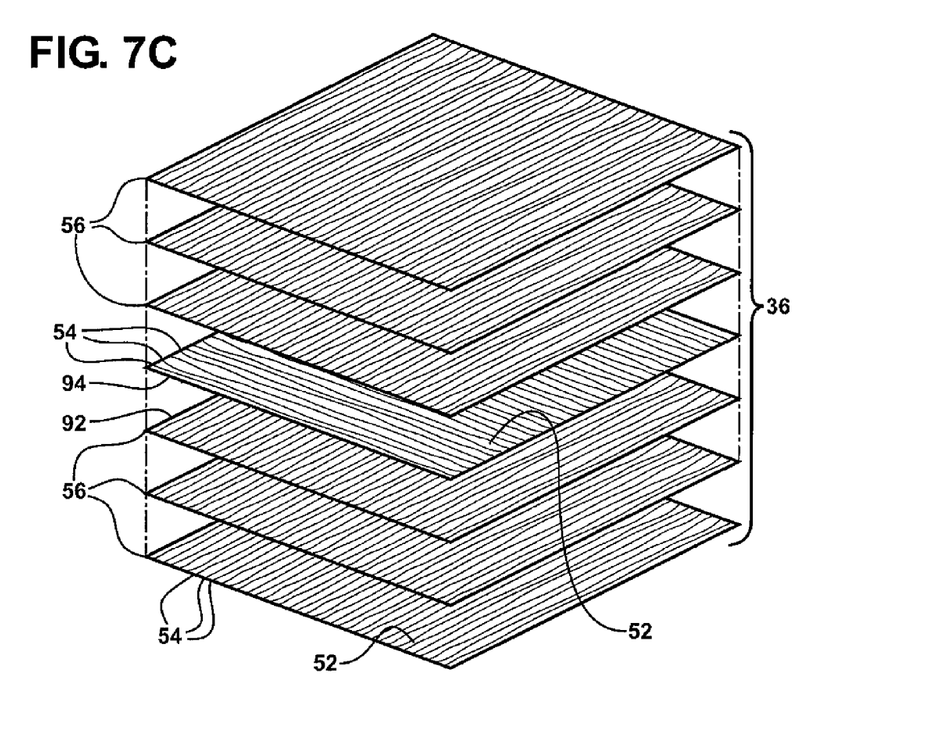
FIG. 7C is an exploded view of yet another embodiment of the reinforcing composite layer.

With reference to FIGS. 7A-C, the reinforcing composite layer 36 is formed of a polymeric material, hereinafter referred to as a second polymeric material 52 for identification purposes, and a plurality of fibers 54, i.e., strands, impregnated in the second polymeric material 52. Typically, the first polymeric material 38 of the backrest 26 and the second polymeric material 52 of the reinforcing composite layer 36 are compatible such that the first polymeric material 38 of the backrest 26 and the second polymeric material 52 of the reinforcing composite layer 36 melt together and integrate with one another, as described further below.

Figure 6:
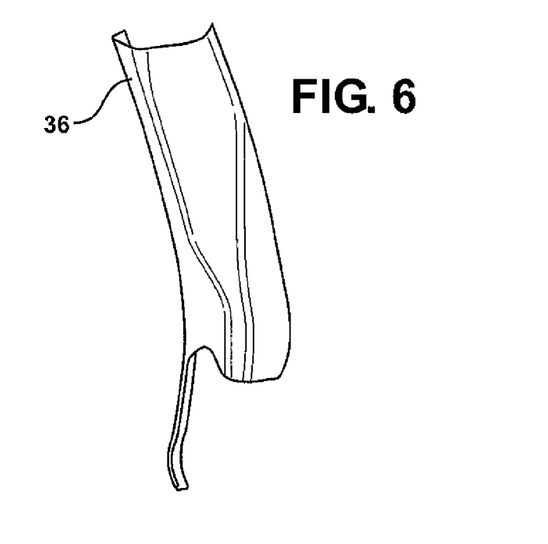
FIG. 6 is a perspective view of the reinforcing composite layer prior to integration with the backrest.

The reinforcing composite layer 36 can include a plurality of sheets 56, as shown in FIGS. 7A-C. It should be appreciated that the sheets 56 shown in FIGS. 7A-C are not yet formed in the shape of the reinforcing composite layer 36 shown in FIG. 6 and are shown for exemplary purposes. An example of the reinforcing composite layer 36 is a continuous fiber reinforced thermoplastic that is commercially available from Baycomp Canada in Burlington, Ontario, Canada under the tradename CFRT. Alternatively, for example, the plurality of fibers 54 and the second polymeric material 52 are simultaneously integrated with the first polymeric material 38. Various embodiments of the reinforcing composite layer 36 are described further below with reference to FIGS. 7A-C.

Figure 8:
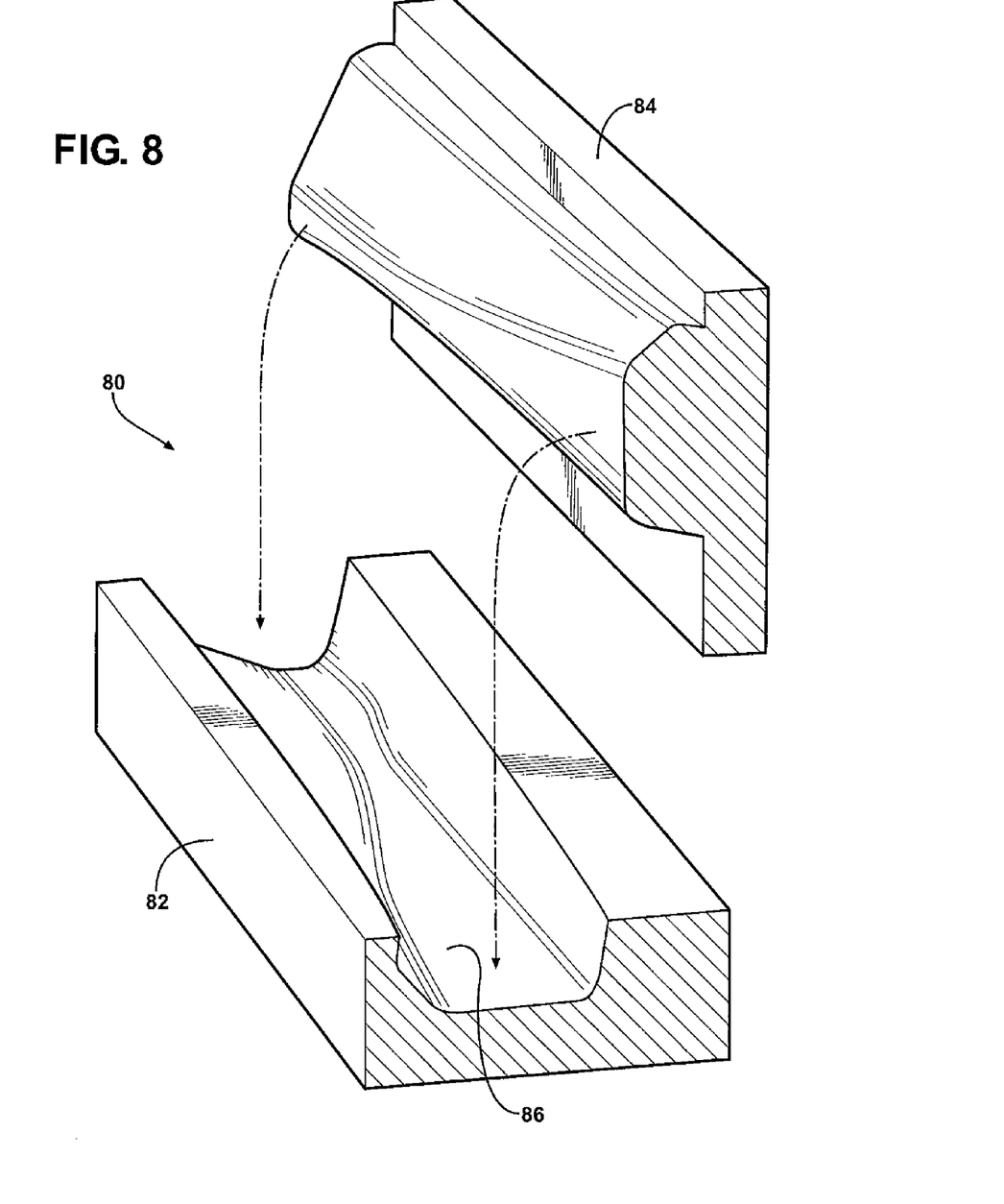
FIG. 8 is a perspective view of a preforming mold for forming the reinforcing composite layer.

The reinforcing composite layer 36 may be, for example, preformed and subsequently integrated with the first polymeric material 38 of the backrest 26, as set forth further below with reference to FIG. 8. In the alternative to, or in addition to the sheets 56, the reinforcing composite layer 36 can include tape, prepregs, etc., and the reinforcing composite layer 36 can be formed by any type of composite manufacturing method without departing from the nature of the present invention.

The second polymeric material 52 of the reinforcing composite layer 36 can be the same material or a different material than the first polymeric material 38 of the backrest 26. As one example, in the embodiment where the first polymeric material 38 is a thermoplastic material, the second polymeric material 52 of the reinforcing composite layer 36 can be a thermoplastic material different than the thermoplastic material of the backrest 26. It should be appreciated that in such an embodiment the thermoplastic material of the backrest 26 and the thermoplastic material of the reinforcing composite layer 36 can be any type of thermoplastic. As one example, the second polymeric material 52 of the reinforcing composite layer 36 is a second nylon different than the first nylon of the backrest 26.

Alternatively, the second polymeric material 52 of the reinforcing composite layer 36 can be the same material as the first polymeric material 38 of the backrest 26. As one example of such a configuration, the first nylon of the backrest 26 and the second nylon of the reinforcing composite layer 36 can be the same type of nylon. It should be appreciated that the second polymeric material 52 of the reinforcing composite layer 36 may alternatively be a thermoset material without departing from the nature of the present invention.

With reference to FIG. 4, the first polymeric material 38 of the backrest 26 is fixed to the bracket 34 and is melt bonded to the second polymeric material 52 of the reinforcing composite layer 36 integrating the backrest 26, the bracket 34, and the reinforcing composite layer 36 to form a single integral component, as set forth above. Similarly, the second reinforcing composite layer 36 is melt bonded to the first polymeric material 38 of the backrest 26.

The combination and integration of the first polymeric material 38 of the backrest 26, the reinforcing composite layer 36, and the bracket 34 attached to each other results in an advantageous combination. Specifically, the first polymeric material 38 of the backrest 26 by itself may fracture when subjected to a load and the reinforcing composite layer 36, by itself, may buckle and/or fracture when subjected to a load. When the first polymeric material 38 of the backrest 26, the reinforcing composite layer 36, and the bracket 34 are integrated with each other, the bracket 34 and the first polymeric material 38 of the backrest 26 support the reinforcing composite layer 36 to prevent buckling and/or fracturing of the reinforcing composite layer 36, i.e., to provide torsional stiffness. The reinforcing composite layer 36 and the bracket 34 reinforce the first polymeric material 38 of the backrest 26 to prevent fracturing of the first polymeric material 38 of the backrest 26 under a load. In other words, the reinforcing composite layer 36 and the bracket 34 provide increased stiffness and impact strength to the seat back 24.

The reinforcing composite layer 36 may be integrated with the first polymeric material 38 of the backrest 26 in a variety of ways. In one configuration, the seat back 24 includes an adhesive layer (not shown) disposed between the first polymeric material 38 of the backrest 26 and the second polymeric material 52 of the reinforcing composite layer 36. In such a configuration, the adhesive layer is selected to have properties such that the adhesive layer is conducive to melt bonding with both the first polymeric material 38 of the backrest 26 and the second polymeric material 52 the reinforcing composite layer 36. Such a configuration increases the range of materials from which the first polymeric material 38 of the backrest 26 and the second polymeric material 52 and the reinforcing composite layer 36 may be selected from because in such a configuration the first polymeric material 38 and the second polymeric material 52 need not be melt bondable to each other but instead can be melt bondable to the adhesive layer. One example of the adhesive layer is a polyurethane layer. However, it should be appreciated that the adhesive layer can comprise any type of material without departing from the nature of the present invention.

With reference to FIG. 4, the backrest 26 and the reinforcing composite layer 36 present abutting surfaces 58. The second polymeric material 52 of the reinforcing composite layer 36 is integrated with the first polymeric material 38 of the backrest 26 along the abutting surfaces 58 to attach the reinforcing composite layer 36 and the backrest 26 to each other. The integration of the backrest 26 and the reinforcing composite layer 36 along the abutting surfaces 58 typically extends along a relatively long uninterrupted interface. This uninterrupted interface increases the strength of the integration between the backrest 26 and the reinforcing composite layer 36.

The first polymeric material 38 of the backrest 26 and the second polymeric material 52 of the reinforcing composite layer 36 are melt bonded to each other along the abutting surfaces 58. For example, the second polymeric material 52 of the reinforcing composite layer 36 can have a melting temperature, herein referred to as a second melting temperature, lower than a melting temperature first polymeric material 38 of the backrest 26, herein referred to as a first melting temperature. For example, the first melting temperature is 560-600° F. and the second melting temperature is 400-560° F. However, it should be appreciated that the second polymeric material 52 of the reinforcing composite layer 36 can have the same melting temperature than the first polymeric material 38 of the backrest 26 without departing from the nature of the present invention.

In the alternative or in addition to melt bonding, the backrest 26 can be mechanically interlocked with the reinforcing composite layer 36. For example, the reinforcing composite layer 36 can define a hole (not shown) or protrusions (not shown) and the backrest 26 extends through and engages the reinforcing composite layer 36 through the hole and/or engages the protrusions.

The bracket 34 is overmolded by the first polymeric material 38 of the backrest 26. In other words, the first polymeric material 38 is formed around features of the bracket 34 such that the polymeric material 38 mechanically engages the bracket. Typically, the first polymeric material 38 is mechanically engaged with the bracket 34 free of any melt bonding between the first polymeric material 38 of the backrest 26 and the second material 50 of the bracket 34. Typically the second material 50 of the bracket 34 forms an interlocking configuration 60 engaged with the first polymeric material 38. For example, with reference to FIGS. 4 and 5, the interlocking configuration 60 of the bracket 34 can include holes 62 to mechanically engage the first polymeric material 38 of the backrest 26. Alternatively or in addition to the holes 62, the interlocking configuration 60 can include other features protruding from the bracket 34 such as studs, hooks, etc.

As set forth above, backrest 26 can be formed by heating the first polymeric material 38 to a pliable or molten state, e.g., by injection molding, and in such a state the first polymeric material 38 can be molded about the bracket 34. In such an embodiment, the first polymeric material 38 of the backrest 26 in the pliable or molten state contacts the interlocking configuration 60, e.g., flows into the holes 62, such that upon solidification of the first polymeric material 38, the first polymeric material 38 and the bracket 34 are mechanically engaged with one another.

With reference to FIG. 4, the bracket 34 and the reinforcing composite layer 36 each present an inner surface 64 opposing each other and an opposite facing outer surface 66. Typically, the bracket 34 is nested with the reinforcing composite layer 36. With reference to FIGS. 2 and 4, the first polymeric material 38 covers at least a portion of one of the outer surfaces 66 to form an uncovered aesthetic show surface 68, i.e., a surface that passes industry standards for aesthetics and does not need to be covered by, for example, leather, foam, etc. The uncovered aesthetic show surface 68 can be referred to in industry as a "class A surface." In the event that a covering is desirable, the backrest 26 can define features for engaging the covering to retain the covering to the seat back 24.

The uncovered aesthetic show surface 68 that covers at least a portion of one of the outer surfaces 66, as described above, covers the typically unaesthetic surfaces of the bracket 34 and the reinforcing composite layer 36. Further, the uncovered aesthetic show surface 68 of the first polymeric material 38 can extend from the first pillar 42 to the second pillar 44 across the middle section 46, as best shown in FIG. 2. The uncovered aesthetic show surface 68 extending from the first pillar 42 to the second pillar 44 across the middle section 46 eliminates the need for a covering on the back of the seat back 24, thereby reducing material and labor cost associated with manufacturing the seat back 24.

It should be appreciated that the backrest 26, the reinforcing composite layer 36, the bracket 34, and any combination thereof may define features of the seat back 24. For example, with reference to FIGS. 1-3, the first polymeric material 38 of the seat back defines headrest guides 70 for receipt of a headrest 72. Alternatively or in addition, the backrest 26, the reinforcing composite layer 36, and the bracket 34 can form, a back panel, side bolsters, trim attachments, foam supports, back supports, armrest mounts, lumbar support, airbag mounts and/or housing, back suspension mounts, etc. and any combination thereof. It should also be appreciated that the seat back 24 features may further define the uncovered aesthetic show surface 68. For example, in the scenario where the backrest 26 is formed by plastic injection molding, the seat back 24 features can be formed along with the backrest 26 by plastic injection molding.

In one embodiment, as shown in FIG. 4, at least a portion 74 of the outer surface 66 of the bracket 34 is free of the first polymeric material 38, i.e., is not covered by the first polymeric material 38. A mounting bracket 76 abuts the uncovered portion 74 of the outer surface 66 of the bracket 34. The mounting bracket 76 extends from the seat cushion 22 and is connected to the bracket 34. The mounting bracket 76 abuts the portion 74 of the outer surface 66 free of the first polymeric material 38 therebetween to encourage proper seating of the mounting bracket 76 on the bracket 34 when connected to the bracket 34.

Fasteners 78, for example, can connect the mounting bracket 76 to the bracket 34. Alternatively or in addition to the fasteners 78, the mounting bracket 76 can be mechanically engaged with the first polymeric material 38 of the backrest 26. In such an embodiment, the mechanical engagement between the mounting bracket 76 and the first polymeric material 38 can be free of melt bonding between the first polymeric material 38 and the mounting bracket 76. For example, the mounting bracket 76 can include holes or other features (not shown) to engage the first polymeric material 38 of the backrest 26 similar to those described above with respect to the bracket 34. In such an embodiment, the first polymeric material 38 of the backrest 26 can be disposed between the mounting bracket 76 and the bracket 34 to integrate the mounting bracket 76 and the bracket 34.

The mounting bracket 76 can be configured to establish a reclining interaction between the backrest 26 and the seat cushion 22, i.e., so that the seat back 24 can selectively rotate backward relative to the seat cushion 22 and/or can selectively rotate forward relative to the seat cushion 22. Alternatively, the mounting bracket 76 can be configured such that the seat back 24 remains fixed in the upright position.

As best shown in FIGS. 7A-C, typically each of the plurality of fibers 54 is further defined as a plurality of continuous fibers, i.e., long fibers, as opposed to discontinuous fibers, i.e., short fibers. It should be appreciated that, alternatively, the plurality of fibers 54 are discontinuous, i.e., short fibers (not shown). In the embodiment where the fibers 54 are continuous, the fibers 54 are elongated, i.e., relatively long and thin, and are aligned generally in parallel with each other such that stress on the reinforcing composite layer 36 is transmitted from the second polymeric material 52 to the fibers 54 such that the fibers 54 reinforce the second polymeric material 52. In other words, the stress is transferred to the fibers 54 to limit and/or control the deformation of the second polymeric material 52 when the reinforcing composite layer 36 is subjected to a load. More specifically, some amount of deformation occurs although the load is transferred to the reinforcing composite layer 36.

The fibers 54 are impregnated and coated with the second polymeric material 52. In the case of continuous fibers, the fibers 54 each, for example, extend in generally the same direction and extend along a length of the reinforcing composite layer 36. In the configuration where the fibers 54 of the reinforcing composite layer 36 are continuous fibers, the reinforcing composite layer 36 by itself is flexible about an axis extending along the continuous fibers and is subject to buckling when subjected to a load. The backrest 26 supports the reinforcing composite layer 36 to prevent flexing about the axis and to prevent buckling when subjected to a load. In the configuration where the fibers 54 are discontinuous, the second polymeric material 52 deforms around the fibers 54 and little stress is transferred from the second polymeric material 52 to the fibers 54.

Whether continuous, discontinuous, or otherwise, the fibers 54 of the individual reinforcement layer typically extend generally in the same direction. Alternatively, the fibers 54 of the individual sheets 56 may extend in different directions or may be woven, i.e., interlaced with each other. The plurality of fibers 54 of the reinforcing composite layer 36 are preferably glass fibers. Alternatively, each the plurality of fibers 54 are carbon fiber; however, it should be appreciated that the fiber may be of any type known to one skilled in the art.

As set forth above, and with reference to FIGS. 7A-C, the reinforcing composite layer 36 can include a plurality of sheets 56. In such a configuration, the sheets 56 are integrally stacked upon each other forming a single stack. The stiffness, strength, and impact strength of the reinforcing composite layer 36 is increased with the addition of each sheet 56. Each sheet 56 is thin relative to the backrest 26. Each of the sheets 56 may be approximately 0.1 to 0.5 mm thick. The plurality of sheets 56 forming the single stack may have a total thickness of approximately 1 to 2 mm. However, it should be appreciated that the reinforcing composite layer 36 can have any thickness without departing from the nature of the present invention. It should also be appreciated that the reinforcing composite layer 36 can have uniform thickness or can have varying thickness.

The plurality of sheets 56 may include any combination of sheets 56 having continuous or discontinuous fibers 54. For example, the plurality of sheets 56 may include a sheets 56 having the continuous fibers, a plurality of sheets 56 having woven fibers, or a combination of at least one sheet 56 having continuous fibers and at least sheet 56 having woven fibers.

In the configuration where the reinforcing composite layer 36 includes the plurality of sheets 56, the material of the fibers 54 of each sheets 56 may be the same as or different than the fibers 54 of each of the other sheets 56. For example, the fibers 54 of each of the sheets 56 may be glass fibers, the fibers 54 of each of the sheets 56 may be carbon fibers, or the plurality of sheets 56 may include a combination of one or more sheets 56 having glass fibers and one or more sheets 56 having carbon fibers.

With continued reference to FIGS. 7A-C, in the configuration where the fibers 54 of each of the sheets 56 are continuous fibers, typically at least a first sheet 92 is oriented with the continuous fibers extending in a first direction D and at least a second sheet 94 is oriented with the continuous fibers extending angularly relative to the first direction D. In other words, the plurality of sheets 56 may be arranged such that the fibers 54 of at least one sheet 56 extend angularly relative to the fibers 54 of other sheets 56. It should be appreciated that sheets 56 can be oriented such that the fibers 54 of one sheet 56 can extend at any angle relative to the fibers 54 of another sheet 56. Alternatively, the plurality of sheets 56 may be arranged such that the continuous fibers of each sheet 56 extend in parallel with the fibers 54 of the other sheets 56.

Several configurations of the plurality of sheets 56 are shown in FIGS. 7A-C. Specifically, FIG. 7A shows an exploded view of a configuration of the plurality of sheets 56 including six sheets 56 each having continuous fibers. Moving upwardly from the bottom in the configuration shown in FIG. 7A, one sheet 56 has fibers 54 extending in the first direction D, the next sheet 56 has fibers 54 extending generally at 90° relative to the first direction D, the next two sheets 56 each have fibers 54 extending generally along the first direction D, the next sheet 56 has fibers 54 extending generally at 90° relative to the first direction D, and the next sheet 56 has fibers 54 extending along the first direction D.

FIG. 7B shows an exploded view of another configuration of the plurality of sheets 56 including six sheets 56 each having fibers 54 that are continuous fibers. Moving upwardly from the bottom in the configuration shown in FIG. 7B, two sheets 56 each have fibers 54 extending in the first direction D, the next two sheets 56 each have fibers 54 extending generally at 90° relative to the first direction D, and the next two sheets 56 each have fibers 54 extending generally in the first direction D.

FIG. 7C shows an exploded view of another configuration of the plurality of sheets 56 including seven sheets 56 each having fibers 54 that are continuous fibers. Moving upwardly from the bottom in the configuration shown in FIG. 7C, three sheets 56 each have fibers 54 extending in the first direction D, the next sheet 56 has fibers 54 extending at 90° relative to the first direction D, and the next three sheets 56 each have fibers 54 extending in the first direction D.

Figure 9:
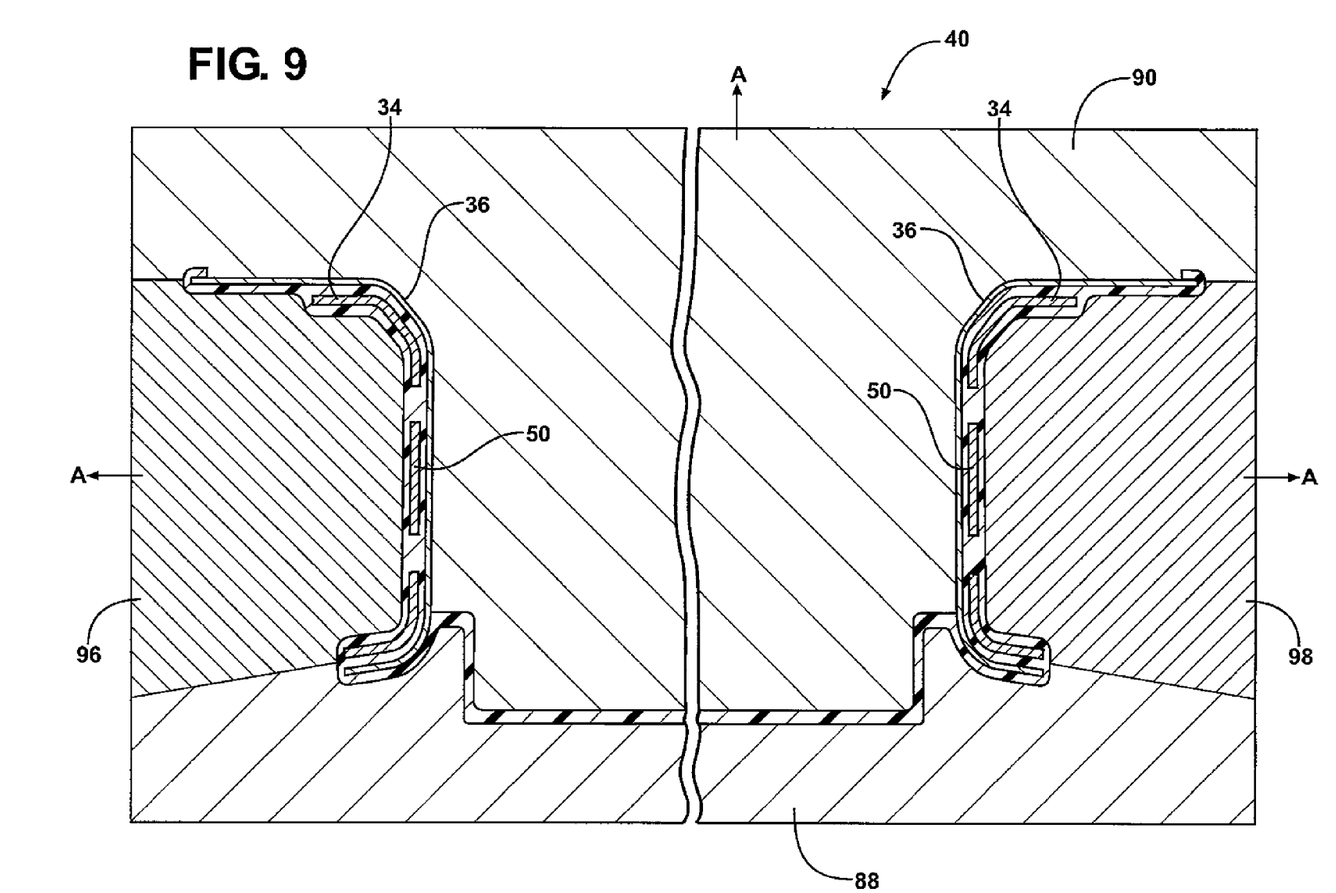
FIG. 9 is a cross-sectional view of a mold for forming the backrest.

The present invention further includes a method of forming the backrest 26. The backrest 26 is formed with the mold 40. With reference to FIG. 9, the method includes the steps of placing the reinforcing composite layer 36 into the mold 40 and placing the bracket 34 into the mold 40 adjacent the reinforcing composite layer 36. The reinforcing composite layer 36 and the bracket 34 can abut each other or can be spaced from each other in the mold 40. The method further includes heating the first polymeric material 38 of the backrest 26 to a molten state and introducing the first polymeric material 38 of the backrest 26 in the molten state into the mold 40 between and in contact with the reinforcing composite layer 36 and the bracket 34 to melt bond with the second polymeric material 52 of the reinforcing composite layer 36 and to mechanically engage the bracket 34. Typically, the first polymeric material 38 mechanically engages the bracket 34 free of melt bonding between the first polymeric material 38 and the bracket 34.

Typically the step of heating the first polymeric material 38 and introducing the first polymeric material 38 into the mold 40 is further defined as injection molding with the use of the mold 40. In such a configuration, the step of introducing the first polymeric material 38 into the mold 40 includes injecting the first polymeric material 38 into the mold 40 under pressure.

The mold 40 includes a main cavity 88 and a main core 90. The main cavity 88 and the main core 90 are moveable relative to each other between a closed position for plastic injection into the mold 40 and an open position for removal of the backrest 26 from the mold 40. The mold 40 also includes a first side core 96 and a second side core 98. In such a configuration, preferably the main cavity 88 remains stationary and the main core 90, the first side core 96, and the second side core 98 are moveable between the open and closed positions. Arrows A are shown in FIG. 9 to illustrate the movement of the main core 70, the first side core 72, and the second side core 74.

The method of the present invention includes the steps of moving the mold 40 to the open position, placing the reinforcing composite layer 36 and the bracket 34 in the mold 40, and moving the mold 40 to the closed position. The method further includes the step of injecting the first polymeric material 38 for the backrest 26 into the mold 40 such that the backrest 26 is formed by the first polymeric material 38 and is integrated with the reinforcing composite layer 36 and the bracket 34, i.e., overmolding. In one embodiment, the reinforcing composite layer 36 and the bracket 34 are spaced from each other and from the mold 40 such that the first polymeric material 38 for the backrest 26 can properly flow therebetween to form a uniform bond when the mold 40 is closed. In another embodiment, the reinforcing composite layer 36 and the bracket 34 can abut each other and the first polymeric material 38 can encase the reinforcing composite layer 36 and the bracket 34 together. The mold 40 typically includes features to ensure proper location of the reinforcing composite layer 36 and the bracket 34 in the mold 40. For example, the mold 40 can include locating holes, draft angles, etc.

It should be appreciated that the reinforcing composite layer 36 and the bracket 34 can be placed in the mold 40 as individual components or can be attached to one another prior to placement into the mold 40. For example, the reinforcing composite layer 36 and the bracket 34 can be attached to one another by mechanical or adhesive connection prior to placement in the mold 40. Examples of a mechanical bond between the reinforcing composite layer 36 and the bracket 34 include bolting, crimping, riveting, etc. Alternatively, the first polymeric material 38 can be introduced by a two-shot molding process where one of the bracket 34 and the reinforcing composite layer 36 are overmolded with a first shot of first polymeric material 38 and the other of the bracket 34 and the reinforcing composite layer 36 are overmolded with a second shot of polymeric material 38.

The method further includes promoting interaction between the first polymeric material 38 of the backrest 26 and the second polymeric material 52 of the reinforcing composite layer 36 to integrate the backrest 26 and the reinforcing composite layer 36. The step of promoting the interaction between the first polymeric material 38 of the backrest 26 and the second polymeric material 52 of the reinforcing composite layer 36 encourages the combination of the first polymeric material 38 and the reinforcing composite layer 36 into a single integral unit. In other words, when the first polymeric material 38 in the molten state is introduced into contact with the reinforcing composite layer 36, the first polymeric material 38 of the backrest 26 and the second polymeric material 52 of the reinforcing composite layer 36 interact with one another such that upon cooling, the backrest 26 and the reinforcing composite layer 36 are integral with each other, i.e., one-piece.

The step of promoting interaction is further defined as melt bonding the first polymeric of the backrest 26 and the second polymeric material 52 of the reinforcing composite layer 36, as set forth above. Specifically, the method includes melting at least a portion of the second polymeric material 52 of the reinforcing composite layer 36 in contact with the first polymeric material 38 of the backrest 26 in the molten state to melt bond the reinforcing composite layer 36 and the first polymeric material 38 of the backrest 26 upon cooling. Melt bonding occurs when the first polymeric material 38 of the backrest 26 in the molten state interacts with the second polymeric material 52 of the reinforcing composite layer 36 while the second polymeric material 52 is in a heated softened state or a molten state. The first polymeric material 38 of the backrest 26 and the second polymeric material 52 of the reinforcing composite layer 36 interact with one another such that upon cooling the first polymeric material 38 of the backrest 26 and the second polymeric material 52 of the reinforcing composite layer 36 are bonded together. Specifically, heat may be transferred from the first polymeric material 38 of the backrest 26 in molten state to the second polymeric material 52 of the reinforcing composite layer 36. The heat softens or melts the second polymeric material 52 and the softened or melted polymeric material interacts with the first polymeric material 38 in the molten state.

In the configuration where the first melting temperature of the first polymeric material 38 of the backrest 26 is greater than the second melting temperature of the second polymeric material 52 of the reinforcing composite layer 36, the step of introducing the first polymeric material 38 includes disposing the first polymeric material 38 of the backrest 26 at the first melting temperature into contact with the reinforcing composite layer 36 such that the second melting temperature is realized during contact to melt bond with the second polymeric material 52. When the first polymeric material 38 of the backrest 26 at the first melting temperature is introduced into contact with the reinforcing composite layer 36, heat is transferred from the first polymeric material 38 of the backrest 26 to the second polymeric material 52 of the reinforcing composite layer 36 such that the temperature of the second polymeric material 52 of the reinforcing composite layer 36 is increased to the first melting temperature, thereby at least softening, and typically melting, the second polymeric material 52 of the reinforcing composite layer 36.

In addition to heat transfer from the first polymeric material 38 of the backrest 26, the melting of the second polymeric material 52 of the reinforcing composite layer 36 may be promoted in a variety of ways. For example, the step of melting the second polymeric material 52 is further defined as heating the mold 40 to conductively heat the reinforcing composite layer 36. The reinforcing composite layer 36 is heated such that less heat energy is required from first polymeric material 38 of the backrest 26 in the molten state to raise the second polymeric material 52 to the second melting temperature.

The method may include heating the reinforcing composite layer 36 prior to disposing the first polymeric material 38 of the backrest 26 in the molten state into contact with the reinforcing composite layer 36. For example, the method may include heating the reinforcing composite layer 36 prior to placing the reinforcing composite layer 36 into the mold 40. Alternatively or in addition, the method may include the step of heating the reinforcing composite layer 36 while the reinforcing composite layer 36 is disposed in the mold 40.

The method may, for example, include the step of insulating the mold 40 near the interface of the first polymeric material 38 and the reinforcing composite layer 36. Specifically, in the configuration where introduction of the first polymeric material 38 into the mold 40 is further defined as plastic injection molding, the process of plastic injection molding heats the mold 40 and the step of insulating the mold 40 maintains heat in the mold 40. The heat of the mold 40 softens the second polymeric material 52 of the reinforcing composite layer 36 to foster melt bonding between the first polymeric material 38 of the first polymeric material 38 and the second polymeric material 52 of the reinforcing composite layer 36 when the first polymeric material 38 is injected into the mold 40.

The method may include the step of heating the mold 40 near the interface of the first polymeric material 38 and the reinforcing composite layer 36. For example, the mold 40 may include heated oil lines (not shown) carrying heated oil. Heat is transmitted from the oil to the mold 40 to heat the mold 40. The heat transferred to the mold 40 by the oil lines softens the second polymeric material 52 to foster melt bonding between the first polymeric material 38 and the second polymeric material 52 when the first polymeric material 38 of the backrest 26 is introduced into contact with the second polymeric material 52 of the reinforcing composite layer 36.

The method may include the step of blowing heated air on the reinforcing composite layer 36 to heat the reinforcing composite layer 36. For example, the mold 40 may include an air pocket (not shown) and heated air is blown from the air pocket onto the reinforcing composite layer 36 when the reinforcing composite layer 36 is disposed in the mold 40. The heated air may be directed to blow on the reinforcing composite layer 36 at the interface of the first polymeric material 38 of the backrest 26 and the reinforcing composite layer 36 prior to introduction of the first polymeric material 38 of the backrest 26 to the interface. The heated air softens the second polymeric material 52 of the reinforcing composite layer 36 to foster melt bonding between the first polymeric material 38 of the backrest 26 and the reinforcing composite layer 36 when the first polymeric material 38 is introduced into contact with the reinforcing composite layer 36.

The method may include the step of plasma treating or flame treating the reinforcing composite layer 36 to relieve surface tension of the reinforcing composite layer 36. The plasma treatment or flame treatment (not shown) is applied to the reinforcing composite layer 36 at the interface of the first polymeric material 38 and the reinforcing composite layer 36 prior to introduction of the first polymeric material 38 to the interface. The plasma treatment or flame treatment of the reinforcing composite layer 36 reduces surface tension and which promotes melt bonding between the first polymeric material 38 and the reinforcing composite layer 36.

The method may include the step of contacting the reinforcing composite layer 36 with plasma treat inserts (not shown) to heat the reinforcing composite layer 36. The plasma treat inserts are contacted with the reinforcing composite layer 36 at the interface of the first polymeric material 38 and the reinforcing composite layer 36 prior to introduction of the first polymeric material 38 to the interface. The plasma treat inserts are removed from the reinforcing composite layer 36 prior to the introduction of the first polymeric material 38 to the interface. The plasma treat inserts soften the reinforcing composite layer 36 to foster melt bonding between the first polymeric material 38 and the reinforcing composite layer 36 when the first polymeric material 38 is introduced into contact with the reinforcing composite layer 36.

Alternatively or in addition, the step of promoting interaction is further defined as mechanically interlocking the backrest 26 and the reinforcing composite layer 36. Specifically, the step is further defined as introducing the first polymeric material 38 of the backrest 26 in the molten state through surface features, e.g., holes, studs, hooks, surface contours, etc. (not shown), to mechanically engage the backrest 26 and the reinforcing composite layer 36 upon cooling of the first polymeric material 38 of the backrest 26. Upon cooling, the first polymeric material 38 is mechanically interlocked with the reinforcing composite layer 36. It should be appreciated that this mechanical engagement of the backrest 26 and the reinforcing composite layer 36 can be in addition to or in the place of the melt bond between the backrest 26 and the reinforcing composite layer 36. The first polymeric material 38 of the backrest 26 can be mechanically engaged with the reinforcing composite layer 36 in the place of melt bonding in a situation where the first polymeric material of the backrest 26 and the polymer of the reinforcing composite layer 36 do not readily melt bond, e.g., incompatible material such as dissimilar thermoplastics or a thermoset, incompatible melt bond temperatures, etc.

Alternatively, or in addition to melt bonding and mechanical interlocking, the step of promoting interaction is further defined as scarifying the abutting surface of the reinforcing composite layer 36 prior to introduction of the first polymeric material 38 of the backrest 26 in the molten state into contact with the abutting surface. In other words, abutting surface of the reinforcing composite layer 36 is roughened to promote melting of the reinforcing composite layer 36 at the abutting surface.

The step of promoting interaction is further defined as applying an adhesion promoter (not shown) onto the reinforcing composite layer 36 prior to disposing the first polymeric material 38 of the backrest 26 in the molten state into contact with the reinforcing composite layer 36. For example, the adhesion promoter is applied to the reinforcing composite layer 36 by spraying, brushing, and/or bathing. The adhesion promoter promotes the melt bonding between the first polymeric material 38 of the backrest 26 and the second polymeric material 52 of the reinforcing composite layer 36. An example of such an adhesion promoter is Gamma-aminopropyl triethoxysilane such as that commercially available from Dow Corning located in Midland, Mich. under the tradename Z-6011 Silane. Another example of such an adhesion promoter is Methylendiphenylbishexahydroazepincarboxamid such as that commercially available from EMS-Primid located in Sumter, S.C. under the tradename Grilbond IL-6.

The method also includes introducing the first polymeric material 38 in molten state into contact with the interlocking configuration 60 of the bracket 34 and cooling the first polymeric material 38 to mechanically engage the first polymeric material 38 with the interlocking configuration 60 of the bracket 34. Since the first polymeric material 38 and the bracket 34 are fixed to each other free of any melt bonding between the first polymeric material 38 and the bracket 34, the engagement between the first polymeric material 38 and the interlocking configuration 60 integrates the first polymeric material 38 and the bracket 34.

The method also can include the step of preforming the reinforcing composite layer 36 into a predetermined shape prior to placing the reinforcing composite layer 36 into the mold 40. The step of preforming is further defined as thermoforming. Alternatively, the step of preforming is further defined as compression molding. As set forth above, the reinforcing composite layer 36 can be formed by any composite manufacturing method without departing from the nature of the present invention. In the configuration including the plurality of sheets 56, each of the plurality of sheets 56 are combined as the single stack by compression thermoforming or compression molding. It should also be appreciated that the mold 40 can be configured such that the reinforcing composite layer 36 is bent or deformed when placed in the mold 40 such that the reinforcing composite layer 36 is retained in the mold 40. In such a configuration, the reinforcing composite layer 36 maintains such a bend or deformation after the first polymeric material 38 is integrated with the reinforcing composite layer 36.

The reinforcing composite layer 36 is typically preformed with the use of a preforming mold 80. The preforming mold 80 includes a female preforming mold half 82 having a preforming cavity 86 corresponding to the predetermined shape and a male preforming mold half 84 corresponding to the preforming cavity 86. In the configuration where the reinforcing composite layer 36 is preformed by thermoforming, reinforcing composite layer 36 is heated and placed in the preforming cavity 86 whereby the male preforming mold half 84 exerts force on the reinforcing composite layer 36 to permanently deform the reinforcing composite layer 36 in the preforming cavity 86. In the configuration where the reinforcing composite layer 36 is preformed by compression molding, the reinforcing composite layer 36 is placed in the preforming cavity 86 and the male preforming mold half 84 exerts force on the reinforcing composite layer 36 to permanently deform the reinforcing composite layer 36 in the preforming cavity 86.

The method further includes the step of combining the sheets 56 into the single stack. The step of combining the plurality of sheets 56 includes positioning at least one of the plurality of sheets 56 with the fibers 54 being continuous and extending in the first direction D and positioning at least another of the plurality of sheets 56 with the fibers 54 being continuous and extending angularly relative the first direction D.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:
1. A seat back comprising:
a backrest formed of a first polymeric material for supporting an occupant;
a one-piece bracket anchored to said backrest for coupling to a seat cushion and formed of a second material different than said first polymeric material of said backrest;

a reinforcing composite layer connected to said backrest and formed of a second polymeric material and a plurality of fibers impregnated in said second polymeric material;

wherein said first polymeric material defines a first pillar, a second pillar spaced from said first pillar, and a middle section extending from said first pillar to said second pillar with said reinforcing composite layer elongated in a vertical direction along said first pillar; and wherein said bracket is elongated in the vertical direction along said backrest and overmolded by said first polymeric material and wherein said first polymeric material is melt bonded to said second polymeric material of said reinforcing composite layer integrating said backrest, said bracket, and said reinforcing composite layer.

2. The seat back as set forth in claim 1 wherein said first polymeric material of said backrest is mechanically engaged with said bracket free of any melt bonding between said first polymeric material of said backrest and said second material of said bracket.

3. The seat back as set forth in claim 2 wherein said second material of said bracket is further defined as metal and said bracket defines an interlocking configuration engaged with said first polymeric material.

4. The seat back as set forth in claim 1 wherein said first polymeric material of said backrest is formed of a first nylon.

5. The seat back as set forth in claim 4 wherein said second polymeric material of said reinforcing composite layer is formed of a second nylon different than said first nylon.

6. A seat back comprising:
a backrest formed of a first polymeric material for supporting an occupant;
a bracket anchored to said backrest for coupling to a seat cushion and formed of a second material different than said first polymeric material of said backrest;
a reinforcing composite layer connected to said backrest and formed of a second polymeric material and a plurality of fibers impregnated in said second polymeric material;
wherein said bracket is overmolded by said first polymeric material and wherein said first polymeric material is melt bonded to said second polymeric material of said reinforcing composite layer integrating said backrest, said bracket, and said reinforcing composite layer; and
wherein said bracket and said reinforcing composite layer each present an inner surface opposing each other and an opposite facing outer surface and wherein said first polymeric material covers at least a portion of one of the outer surfaces to form an uncovered aesthetic show surface.

7. A seat back comprising:
a backrest formed of a first polymeric material for supporting an occupant;
a bracket anchored to said backrest for coupling to a seat cushion and formed of a second material different than said first polymeric material of said backrest;
a reinforcing composite layer connected to said backrest and formed of a second polymeric material and a plurality of fibers impregnated in said second polymeric material;
wherein said bracket is overmolded by said first polymeric material and wherein said first polymeric material is melt bonded to said second polymeric material of said reinforcing composite layer integrating said backrest, said bracket, and said reinforcing composite layer; and
wherein said first polymeric material defines a first pillar, a second pillar spaced from said first pillar, and a middle section extending from said first pillar to said second pillar with said reinforcing composite layer elongated in a vertical direction along said first pillar.

8. The seat back as set forth in claim 7 further comprising a second reinforcing composite layer spaced from said reinforcing composite layer with said second reinforcing composite layer elongated in a vertical direction along said second pillar and melt bonded to said first polymeric material of said backrest.

9. The seat back as set forth in claim 8 wherein said uncovered aesthetic show surface of said first polymeric material extends from said first pillar to said second pillar across said middle section.

10. A seat back comprising:
a backrest formed of a first polymeric material for supporting an occupant;
a bracket anchored to said backrest for coupling to a seat cushion and formed of a second material different than said first polymeric material of said backrest;
a reinforcing composite layer connected to said backrest and formed of a second polymeric material and a plurality of fibers impregnated in said second polymeric material;
wherein said bracket is overmolded by said first polymeric material and wherein said first polymeric material is melt bonded to said second polymeric material of said reinforcing composite layer integrating said backrest, said bracket, and said reinforcing composite layer; and
wherein said bracket and said reinforcing composite layer each presents an inner surface opposing each other and an opposite facing outer surface free of first polymeric material and further comprising a mounting bracket abutting said outer surface of said bracket for connecting the bracket to the seat cushion; and
wherein said first polymeric material covers at least a portion of one of the outer surfaces to form an uncovered aesthetic show surface.

11. A seat back comprising:
a backrest formed of a first polymeric material for supporting an occupant;
a bracket anchored to said backrest for coupling to a seat cushion and formed of a second material different than said first polymeric material of said backrest;
a reinforcing composite layer connected to said backrest and formed of a second polymeric material and a plurality of fibers impregnated in said second polymeric material;
wherein said bracket is overmolded by said first polymeric material and wherein said first polymeric material is melt bonded to said second polymeric material of said reinforcing composite layer integrating said backrest, said bracket, and said reinforcing composite layer;
wherein said first polymeric material defines a first pillar, a second pillar spaced from said first pillar, and a middle section extending from said first pillar to said second pillar with said reinforcing composite layer elongated in a vertical direction along said first pillar; and
a mounting bracket mechanically engaged with said first polymeric material of said backrest free of melt bonding between said first polymeric material of said backrest and said mounting bracket.

12. A method of forming a seat back including a first polymeric material and a reinforcing composite layer formed of a second polymeric material and a plurality of fibers impregnated in the second polymeric material, said method comprising:
placing the reinforcing composite layer into a mold;
placing an elongated one-piece bracket for coupling to a seat cushion into the mold adjacent to the reinforcing composite layer;

heating the first polymeric material to a molten state; and
introducing the first polymeric material in the molten state into the mold between and into contact with the reinforcing composite layer and the bracket to melt bond with the second polymeric material of the reinforcing composite layer and to mechanically engage the bracket for forming the backrest with a first pillar, a second pillar spaced from the first pillar, and a middle section extending from the first pillar to the second pillar with the reinforcing composite layer elongated in a vertical direction along the first pillar and integrating the backrest, the bracket, and reinforcing composite layer.

13. The method as set forth in claim 12 wherein the first polymeric material of the backrest has a first melting temperature and the second polymeric material of the reinforcing composite layer has a second melting temperature less than the first melting temperature and wherein introducing the first polymeric material includes disposing the first polymeric material at the first melting temperature into contact with the reinforcing composite layer such that the second melting temperature is realized during contact to melt bond with the second polymeric material.

14. The method as set forth in claim 13 wherein the bracket is formed of a second material different than the first polymeric material of the backrest and has an interlocking configuration and wherein introducing the first polymeric material includes introducing the first polymeric material into contact with the interlocking configuration and cooling the first polymeric material to mechanically engage the first polymeric material with the interlocking configuration of the bracket.

15. A seat assembly comprising:
a seat back including a backrest formed of a first polymeric material for supporting an occupant, a one-piece bracket anchored to said backrest for coupling to a seat cushion and formed of a second material different than said first polymeric material of said backrest, and a reinforcing composite layer connected to said backrest and formed of a second polymeric material and a plurality of fibers impregnated in said second polymeric material; and
a seat cushion coupled to said bracket;
wherein said first polymeric material defines a first pillar, a second pillar spaced from said first pillar, and a middle section extending from said first pillar to said second pillar with said reinforcing composite layer elongated in a vertical direction along said first pillar;
wherein said bracket is elongated in the vertical direction along said first pillar of said backrest and overmolded by said first polymeric material and wherein said first polymeric material is melt bonded to said second polymeric material of said reinforcing composite layer integrating said backrest, said bracket, and said reinforcing composite layer.

16. The seat assembly as set forth in claim 15 wherein said first polymeric material of said backrest is mechanically engaged with said bracket free of any melt bonding between said first polymeric material of said backrest and said second material of said bracket.

17. The seat assembly as set forth in claim 15 wherein said second material of said bracket is further defined as metal and said bracket defines an interlocking configuration engaged with said first polymeric material.

18. A seat assembly comprising:
a seat back including a backrest formed of a first polymeric material for supporting an occupant, a bracket anchored to said backrest and formed of a second material different than said first polymeric material of said backrest, and a reinforcing composite layer connected to said backrest and formed of a second polymeric material and a plurality of fibers impregnated in said second polymeric material;
a seat cushion coupled to said bracket;
wherein said bracket is overmolded by said first polymeric material and wherein said first polymeric material is melt bonded to said second polymeric material of said reinforcing composite layer integrating said backrest, said bracket, and said reinforcing composite layer; and
wherein said bracket and said reinforcing composite layer each present an inner surface opposing each other and an opposite facing outer surface and wherein said first polymeric material covers at least a portion of one of the outer surfaces to form an uncovered aesthetic show surface.

19. A seat assembly comprising:
a seat back including a backrest formed of a first polymeric material for supporting an occupant, a bracket anchored to said backrest and formed of a second material different than said first polymeric material of said backrest, and a reinforcing composite layer connected to said backrest and formed of a second polymeric material and a plurality of fibers impregnated in said second polymeric material;
a seat cushion coupled to said bracket;
wherein said first polymeric material defines a first pillar, a second pillar spaced from said first pillar, and a middle section extending from said first pillar to said second pillar with said reinforcing composite layer elongated in a vertical direction along said first pillar;
wherein said bracket is overmolded by said first polymeric material and wherein said first polymeric material is melt bonded to said second polymeric material of said reinforcing composite layer integrating said backrest, said bracket, and said reinforcing composite layer;
wherein said bracket and said reinforcing composite layer each presents an inner surface opposing each other and an opposite facing outer surface free of first polymeric material and further comprising a mounting bracket abutting said outer surface of said bracket for connecting the bracket to the seat cushion.

20. A seat assembly comprising:
a seat back including a backrest formed of a first polymeric material for supporting an occupant, a bracket anchored to said backrest and formed of a second material different than said first polymeric material of said backrest, and a reinforcing composite layer connected to said backrest and formed of a second polymeric material and a plurality of fibers impregnated in said second polymeric material;
a seat cushion coupled to said bracket;
wherein said bracket is overmolded by said first polymeric material and wherein said first polymeric material is melt bonded to said second polymeric material of said reinforcing composite layer integrating said backrest, said bracket, and said reinforcing composite layer;
wherein said first polymeric material defines a first pillar, a second pillar spaced from said first pillar, and a middle section extending from said first pillar to said second pillar with said reinforcing composite layer elongated in a vertical direction along said first pillar;
wherein said bracket and said reinforcing composite layer each presents an inner surface opposing each other and an opposite facing outer surface and wherein said first polymeric material covers at least a portion of one of the outer surfaces to form an uncovered aesthetic show surface; and a mounting bracket mechanically engaged with said first polymeric material of said backrest free of melt bonding between said first polymeric material of said backrest and said mounting bracket.

\* \* \* \* \*